United States Patent
Weber (10) Patent No.: US 12,189,825 B2
(45) Date of Patent: *Jan. 7, 2025

(54) METHOD FOR IDENTIFYING AND VERIFYING CONTROL SOFTWARE OF A RAIL VEHICLE

(71) Applicant: Siemens Mobility GmbH, Munich (DE)

(72) Inventor: Matthias Alexander Weber, Uttenreuth (DE)

(73) Assignee: Siemens Mobility GmbH, Munich (DE)

( * ) Notice: Subject to any disclaimer, the term of this patent is extended or adjusted under 35 U.S.C. 154(b) by 240 days.

This patent is subject to a terminal disclaimer.

(21) Appl. No.: 17/797,202

(22) PCT Filed: Jan. 13, 2021

(86) PCT No.: PCT/EP2021/050538
§ 371 (c)(1),
(2) Date: Aug. 3, 2022

(87) PCT Pub. No.: WO2021/156028
PCT Pub. Date: Aug. 12, 2021

(65) Prior Publication Data
US 2023/0069564 A1    Mar. 2, 2023

(30) Foreign Application Priority Data

Feb. 3, 2020 (DE) ............ 10 2020 201 259.8

(51) Int. Cl.
*G06F 21/64* (2013.01)
*G06F 21/44* (2013.01)
*G06F 21/57* (2013.01)

(52) U.S. Cl.
CPC ............. *G06F 21/64* (2013.01); *G06F 21/44* (2013.01); *G06F 21/57* (2013.01)

(58) Field of Classification Search
None
See application file for complete search history.

(56) References Cited

U.S. PATENT DOCUMENTS

| | | |
|---|---|---|
| 2016/0266890 A1 | 9/2016 | Aleksandrov et al. |
| 2018/0024826 A1 | 1/2018 | Caushi et al. |
| 2019/0342152 A1 | 11/2019 | Troia et al. |

FOREIGN PATENT DOCUMENTS

| | | | |
|---|---|---|---|
| EP | 2254039 A1 | 11/2010 | |
| EP | 2927088 B1 | 9/2017 | |
| WO | WO-2011101249 A2 * | 8/2011 | ........... G06F 21/552 |
| WO | 2013016831 A1 | 2/2013 | |

OTHER PUBLICATIONS

Schlingloff, Holger et al.: "Betrachtung zur Softwareentwickung im Eisenbahnbereich", [Consideration of software development in the railway sector], EBA Forschungsbericht Nummer Jan. 2019, SSN 2627-9851 Bonn, Feb. 2019, http://www.eba.bund.de/forschungsberichte, retrieved Oct. 21, 2020—English abstract.

* cited by examiner

*Primary Examiner* — Brian Whipple
(74) *Attorney, Agent, or Firm* — Laurence A. Greenberg; Werner H. Stemer; Ralph E. Locher (57) ABSTRACT

A method identifies and verifies control software of a rail vehicle. In the method, the control software is formed by functions, with each function fulfilling an associated task. As a networked collective, the functions form the structure of the control program. A function-dependent checksum is generated for each function. A structure-dependent checksum is generated for the structure. A total checksum is generated for the control software from the function-dependent checksums and the structure-dependent checksum. The total checksum identifies and verifies the control software for homologation in a country.

9 Claims, 5 Drawing Sheets

METHOD FOR IDENTIFYING AND VERIFYING CONTROL SOFTWARE OF A RAIL VEHICLE

FIELD AND BACKGROUND OF THE INVENTION

The invention relates to a method for identifying and verifying control software of a rail vehicle.

Rail vehicles that are designed for transnational use have control software the functional elements of which, partially structured into blocks, are connected inseparably to one another.

Control software corresponds to rules that are typical for a country and is authorized and verified for a rail network of a country.

A checksum is formed by way of the control software. The country-specific authorization is carried out and the verification of the control software for this country is ensured based on the checksum.

In the case of different rules that are typical for a country, this results in different versions of an item of control software under consideration for respective countries.

Manufacturers of control software would like to use standardized authorized control software for a large number of countries.

Taking this as a basis, disadvantages in the authorization process in Europe are outlined by way of example below:

There is the risk of control software that has already been authorized in a first group of countries in Europe having to be changed due to an objection from another country.

In the case of planned, transnational use, the control software, which has now been changed, loses the authorizations that have already been granted in the countries of the first group of countries and has to be authorized in them again.

There is additionally the danger that country-specific distinctions are required for selected functions of the control software, meaning that approaches that contradict one another across Europe need to be solved for the control software.

In order to minimize or to rectify these disadvantages, it is known to keep country-specific control software on the rail vehicle. When crossing a border, associated country-specific control software is then selected and loaded into a controller of the rail vehicle.

However, this approach entails the following disadvantages:

- it is necessary to provide a redundant memory system for different control software or for different control programs and parameters in the vehicle,
- programs and parameters have to be reloaded at national borders, with the reloading being time-intensive due to the size of the program,
- it is necessary to take precautions as to whether the reloading should take place when the rail vehicle is stationary or when it is operating when crossing the border,
- issues regarding responsibility during reloading have to be clarified (for example whether or not the reloading must/should be performed by the rail vehicle driver),
- in the event that an authority denies authorization, it is necessary to keep potentially older authorized programs and parameters in order to be able to load them,
- during maintenance, it has to be ensured that in each case correct control software sets are installed on the redundant memory systems,
- multiple controllers are typically installed in a rail vehicle, meaning that the number of programs is multiplied, resulting in increased parts costs,
- last of all, an increased investment has to be made in development, management and maintenance of the programs.

In summary, the practicality of this approach is highly limited.

SUMMARY OF THE INVENTION

The object of the present invention is therefore to specify control software for a rail vehicle so as to enable easier authorization and at the same time to at least reduce or entirely avoid the abovementioned disadvantages.

This object is achieved by the features of the independent claim. Advantageous developments are specified in the respective dependent claims.

In the method according to the invention for identifying and verifying control software of a rail vehicle, the control software is described by functions that are structurally interconnected with one another in their entirety.

A function performs a task assigned thereto, while the entirety of the interconnection of the functions is referred to as a structure of the control software.

A function-dependent checksum is created for each function, wherein changes to a function are indicated by a change to the respective checksum.

A structure-dependent checksum is created for the structure, wherein a change to the structure is indicated by a change to the structural checksum.

An overall checksum is formed from the function-dependent checksums of the functions that are used and from the structure-dependent checksum of the structure and forms a unique fingerprint of particular control software and is used for verification.

Authorization in a country is performed based on the overall checksum.

A country-specific change is made to chosen functions and/or to the structure. As a result, the function-dependent checksums and/or the structure-dependent checksum and, ultimately, the overall checksum are changed.

The country-specific change thus causes a change to the overall checksum, which thus indicates this change.

Any required follow-up authorization is performed based on the overall checksum.

An unchanged overall checksum indicates unchanged control software that does not have to be checked and authorized again in a country-specific manner.

A changed overall checksum accordingly indicates changed control software that has to be checked and authorized again in a country-specific manner.

In the context of a detailed report able to be carried out on the control software, unchanged function checksums indicate unchanged functions, the influence of which on the control software potentially does not have to be checked again.

Accordingly, changed function checksums indicate changed functions, the influence of which on the control software has to be checked again.

In one advantageous development, in the case of unchanged functions and in the case of an unchanged structure of the control software, an overall checksum is thus formed and indicates unchanged control software.

In the case of a change to the control software for country-specific reasons, a country-specific function is formed from a chosen unchanged function by changing the function. Forming the country-specific function forms a country-specific overall checksum that differs from the overall checksum of the unchanged control software.

In the case of a change to the structure of the control software for country-specific reasons, a country-specific structure is formed. Forming the country-specific structure forms a country-specific overall checksum that differs from the overall checksum of the unchanged control software.

In one advantageous development, either the country-specific function or the unchanged function is activated and operated in the control software with the aid of a country identifier.

In the case of an activated country-specific function and in the case of an unchanged structure of the control software, the country-specific overall checksum of the control software is displayed for verification.

In the case of an activated unchanged function and in the case of an unchanged structure of the control software, the overall checksum of the unchanged control software is displayed for verification.

In one advantageous development, the country identifier is selected on the basis of the rail network in which the rail vehicle is located or into which the rail vehicle is traveling or entering.

In one advantageous development, the country identifier and/or a corresponding version number of the control software, which is based on the overall checksum of the control software, is displayed to the rail vehicle driver for monitoring purposes.

In one advantageous development, a first function supplies both the unchanged function and the country-specific function, as downstream functions, with results. The two downstream functions ascertain respective results. Using the country identifier, which acts on a selection block, only one of the results is however transmitted to a further function.

In one advantageous development, when ascertaining the structure, branching points are detected in the signal profile of the control software. Connections identified by way of branching points are substituted in order to calculate the checksum of the structure.

The present invention makes it possible to uniquely identify the authorization state of control software of a rail vehicle, and thus to verify an authorization.

In summary, an overall checksum is created for each item of rail network-dependent or country-dependent control software by way of associated source codes and provided with a version number. This forms a meaningful fingerprint for the control software for each country.

Depending on the national rail network in which the rail vehicle is operated, the associated control software is activated and a corresponding version number of the control software is displayed to the rail vehicle driver for monitoring purposes.

If changes are then made to the control software for a rail network of a country, for example due to requirements of an authorization authority, then that part of the control software specific to this rail network is supplemented or modified.

Overlapping code or source code affected by changes is copied and modified.

By virtue of a suitable method for creating the fingerprint, it is possible, on the basis of the respective checksums, to show, for all unchanged network-specific parts of the control software, that these have not changed, meaning that another authorization for these software portions with authorities that have already authorized these software portions is no longer necessary.

The present invention makes it possible
to reduce authorization costs and risks,
to reduce what is known as "time to market", and
to be able to implement network-specific client wishes with low expenditure from an authorization viewpoint.

The present invention has in particular an advantage when the structure of the functions is able to be retained in the case of a country-specific change to the control software.

It is then possible to easily change over between country-specific functions depending on rail networks or countries. The control software itself contains the respective functions. When crossing a border, uploading of country-specific control software is thus avoided; only a country-induced functional changeover takes place when crossing the border.

Changing over from a selected function to a country-specific function achieves authorization in a destination country, and this is indicated by the associated overall checksum.

At the same time, authorization that has already been granted in other countries is maintained, since the selected function remains unchanged for these countries, meaning that neither the checksums of the functions involved nor the checksum of the structure nor the overall checksum are changed.

The invention is explained in more detail below with reference to a drawing, in which:

DETAILED DESCRIPTION OF THE INVENTION

Figure 1:
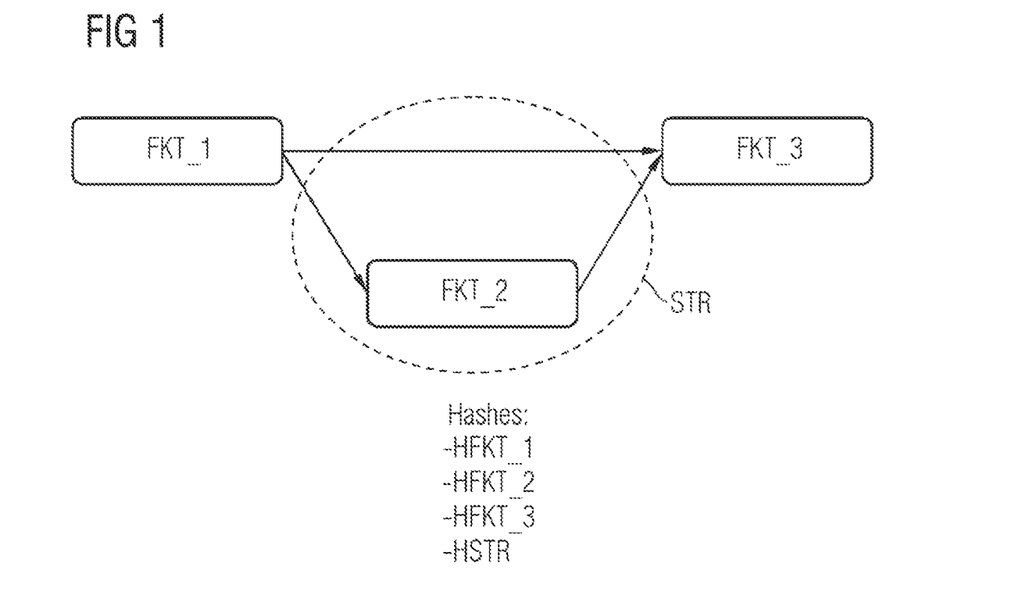
FIG. 1 shows a basic illustration of a starting situation for the method according to the invention.

FIG. 1 shows a basic illustration of a starting situation for the method according to the invention for an intended authorization of control software of a rail vehicle.

The method according to the invention is based on the fact that the control software is formed as a program by a number of structurally interconnected functions FKT_1, FKT_2, FKT_3.

Each function FKT_1, FKT_2, FKT_3 is assigned a task to be performed.

A respective checksum is formed by way each function FKT_1, FKT_2, FKT_3 in the form of what is known as a "hash", such that
a first function FKT_1 has a first checksum HFKT_1,
a second function FKT_2 has a second checksum HFKT_2, and
a third function FKT_3 has a third checksum HFKT_3.

The functions FKT_1, FKT_2, FKT_3 of the control software, illustrated here in highly simplified form, are structurally interconnected with one another.

The interconnection of the functions FKT_1, FKT_2, FKT_3 forms a structure STR. A checksum HSTR, referred to as a hash, is likewise formed by way of this structure STR.

In the case of the structure STR shown here, the first function FKT_1 is linked to the third function FKT_3 either directly or via the second function FKT_2.

An overall checksum HGES is formed from the checksums of the functions HFKT_1 to HFKT_3 and from the checksum of the structure HSTR and uniquely describes the control software, and may thus be considered to be its fingerprint.

The control software is authorized based on the overall checksum HGES.

Figure 2:
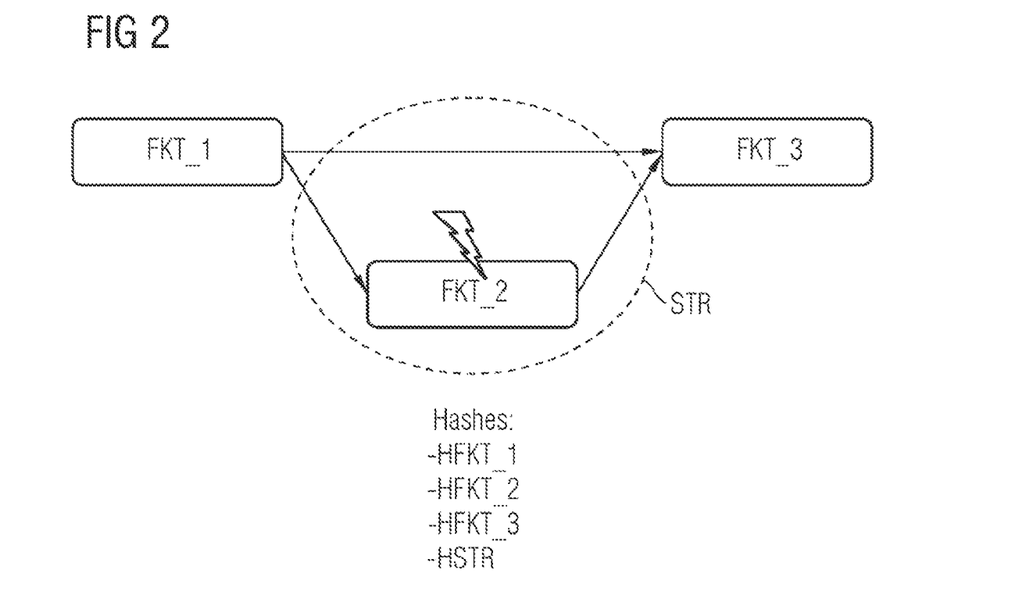
FIG. 2 shows, with reference to FIG. 1, a situation for subsequent considerations regarding the invention.

FIG. 2 shows, with reference to FIG. 1, a situation for subsequent considerations regarding the invention.

It is assumed here that authorization is not given for the second function FKT_2 in a selected country, which is referred to hereinafter as destination country ZLL.

By way of example, in the context of the destination country authorization, a functionality of the second function FKT_2 that is adapted to the destination country ZLL is required. This situation is illustrated by a lightning symbol on the second function FKT_2.

Figure 3:
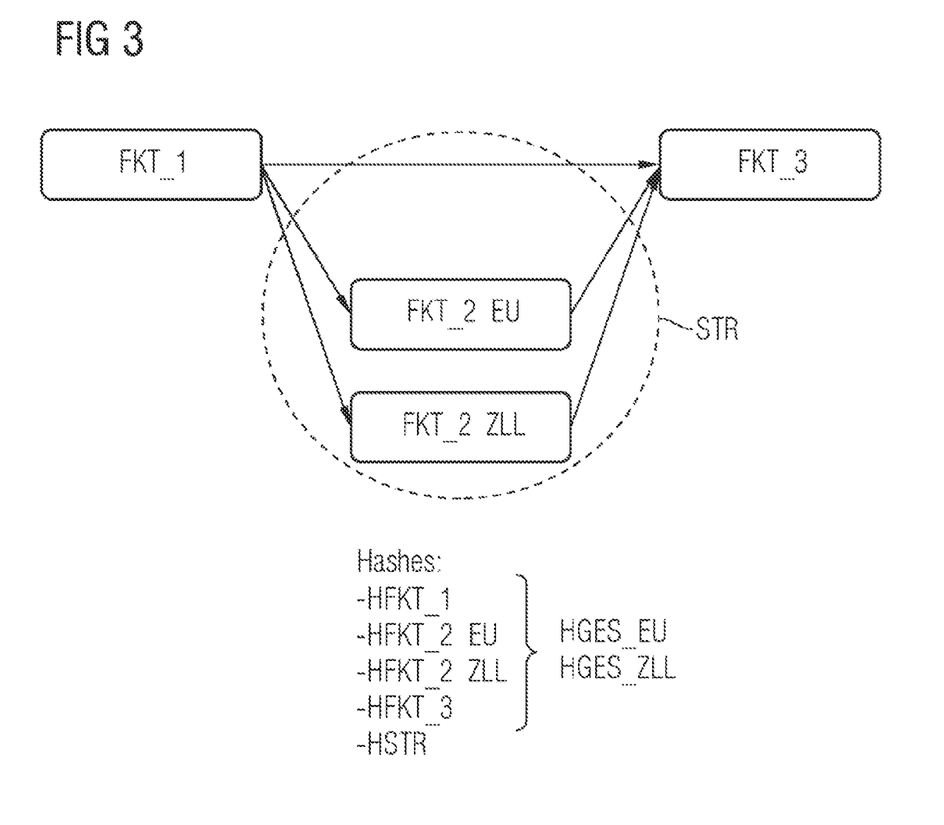
FIG. 3 shows, with reference to the previous figures, details regarding the method according to the invention.

FIG. 3 shows, with reference to the previous figures, details regarding the method according to the invention.

It is assumed that a first authorization for Europe has been performed for the control software.

This authorization, which is referred to hereinafter as EU authorization, is based on an overall checksum HGES_EU.

The control software is however not authorized in the destination country ZLL, which requires, with reference to FIG. 2, a change to the second function FKT_2 illustrated in said figure.

The overall checksum HGES_EU is thus based on:
the first checksum HFKT_1 of the first function FKT_1,
a second checksum HFKT_2 EU of a second function FKT_2 EU,
the third checksum HFKT_3 of the third function FKT_3, and on
the checksum HSTR of the structure STR.

With regard to the previous figures, the second function FKT_2 EU shown here corresponds to the second function FKT_2 described in FIG. 1 and FIG. 2.

The second checksum HFKT_2 EU thus corresponds to the second checksum HFKT_2 described in FIG. 1 and FIG. 2.

With regard to the previous figures, the overall checksum HGES_EU for the EU authorization thus corresponds to the overall checksum HGES described in FIG. 1 and FIG. 2.

The authorization for the destination country ZLL, which is referred to hereinafter as ZLL authorization, is based on an overall checksum HGES_ZLL.

The overall checksum HGES_ZLL is based on:
the first checksum HFKT_1 of the first function FKT_1,
a second checksum HFKT_2 ZLL of a second function FKT_2 ZLL,
the third checksum HFKT_3 of the third function FKT_3, and based on
the checksum HSTR of the structure STR.

For the destination country ZLL, the structure STR of the functions FKT_1, FKT_2 ZLL, FKT_3 involved is unchanged with regard to the previous figures.

Only the second function FKT_2 ZLL is adapted to country-specific rules of the destination country ZLL or to rules of the associated rail network.

The second function FKT_2 ZLL accordingly has a checksum HFKT_2 ZLL that is assigned thereto.

As described above, "hashes" or checksums are formed for the individual functions:
the first checksum HFKT_1 for the first function FKT_1,
the second checksum HFKT_2 ZLL for the second function FKT_2 ZLL adapted to the destination country ZLL,
the third checksum HFKT_3 for the third function FKT_3.

It should be noted that the structure STR for the destination country authorization and for EU authorization is the same:

For the EU authorization, the first function FKT_1 is linked to the third function FKT_3 either directly or via the second function FKT_2 EU.

For the destination country authorization, the first function FKT_1 is linked to the third function FKT_3 either directly or via the second function FKT_2 ZLL.

The checksum HSTR formed by way of the structure STR is thus identical for the countries in Europe and for the destination country.

In the context of the EU authorization, which applies for example for all countries in Europe but not for the destination country ZLL, the third function FKT_3 thus uses results from the second function FKT_2 EU, while, in the context of the destination country authorization, the third function FKT_3 uses results from the second function FKT_2 ZLL.

For the EU authorization, the checksums HFKT_1, HFKT_2 EU, HFKT_3 and HSTR are used. The overall checksum HGES_EU is formed from these checksums.

For the destination country authorization, the checksums HFKT_1, HFKT_2 ZLL, HFKT_3 and HSTR are used. An overall checksum HGES_ZLL is formed from these checksums.

One essential advantage of the present invention has an impressive effect here:

With the structure STR staying the same, when developing the control software, it is possible to change over between country-specific functions depending on rail networks or countries—here between the functions FKT_2 ZLL and FKT_2 EU depending on the country.

The control software itself contains both functions FKT_2 ZLL and FKT_2 EU. When crossing a border, uploading of country-specific control software is thus avoided; only a functional changeover takes place when crossing the border.

The country-specific second function FKT_2 ZLL means that the destination country authorization is achieved and indicated by way of the overall checksum HGES_ZLL.

At the same time, the EU authorization is maintained, since its second function FKT_2 EU=FKT_2 remains unchanged, meaning that the overall checksum HGES_EU=HGES does not change either.

Figure 4:
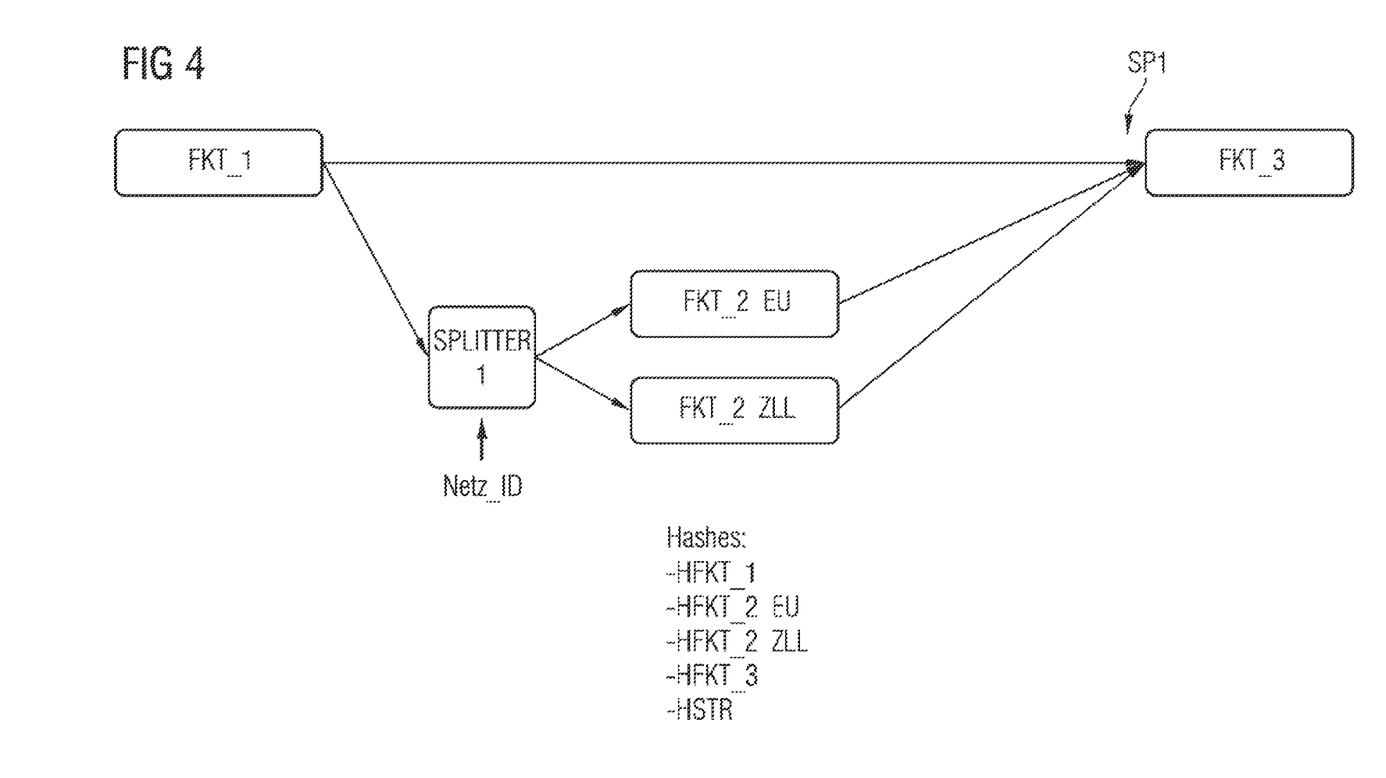
FIG. 4 shows, with reference to FIG. 3, a first advantageous refinement of the method according to the invention.

FIG. 4 shows, with reference to FIG. 3, a first advantageous refinement of the method according to the invention.

With regard to the respective input of the second function FKT_2 EU or FKT_2 ZLL and the output of the first function FKT_1, a splitter block SPLITTER1 is interposed, as shown.

A country-specific selection is made using the splitter block SPLITTER1, this being controlled with selection of the network identifier Netz_ID that is supplied.

This constellation is used when either the function FKT_2 EU or the function FKT_2 ZLL, based on supplied results from the first function FKT_1, calculates a respective result that is then passed on to the third function FKT_3 for further processing.

The splitter block SPLITTER1 accordingly delivers results from the first function FKT_1 either to the function FKT_2 EU or to the function FKT_2 ZLL.

For the splitter block SPLITTER1, the country identifier is Netz_ID=ZLL when the rail vehicle is located in the destination country. Accordingly, for the splitter block SPLITTER1, the country identifier is Netz_ID=EU when the rail vehicle is located in the countries in Europe.

If the rail vehicle is located in the destination country ZLL, the calculated results from the first function FKT_1 are transmitted or switched through to the function FKT_2 ZLL by the splitter block SPLITTER1 using the network identifier Netz_ID=ZLL.

If the rail vehicle is located in countries in Europe, the calculated results from the first function FKT_1 are transmitted or switched through to the function FKT_2 EU by the splitter block SPLITTER1 using the network identifier Netz_ID=EU.

Based on this, a respective result is calculated by the function FKT_2 EU or FKT_2 ZLL and is then passed on to the third function FKT_3 for further processing.

The splitter block SPLITTER1 has no influence on the structure STR; it has a neutral function and is used only for the country-specific selection of the functions FKT_2 EU or FKT_2 ZLL. It accordingly has no influence on the checksum HSTR, which is identical both for the countries in Europe and for the destination country.

In order to ascertain the structure STR, points of intersection begin to be sought in the selection block SPLITTER1. Connections identified by way of the points of intersection are substituted and a checksum of the structure HSTR is calculated.

This is achieved for example by ascertaining subnetworks that are located downstream of the selection block SPLITTER1:

Subnetwork 1: FKT_2 EU->FKT_3
Subnetwork 2: FKT_2 ZLL->FKT_3

These two subnetworks are intersected. It is thereby identified that a point of intersection has to be present at the input of the third function FKT_3, which is referred to here as point of intersection SP1.

Figure 5:
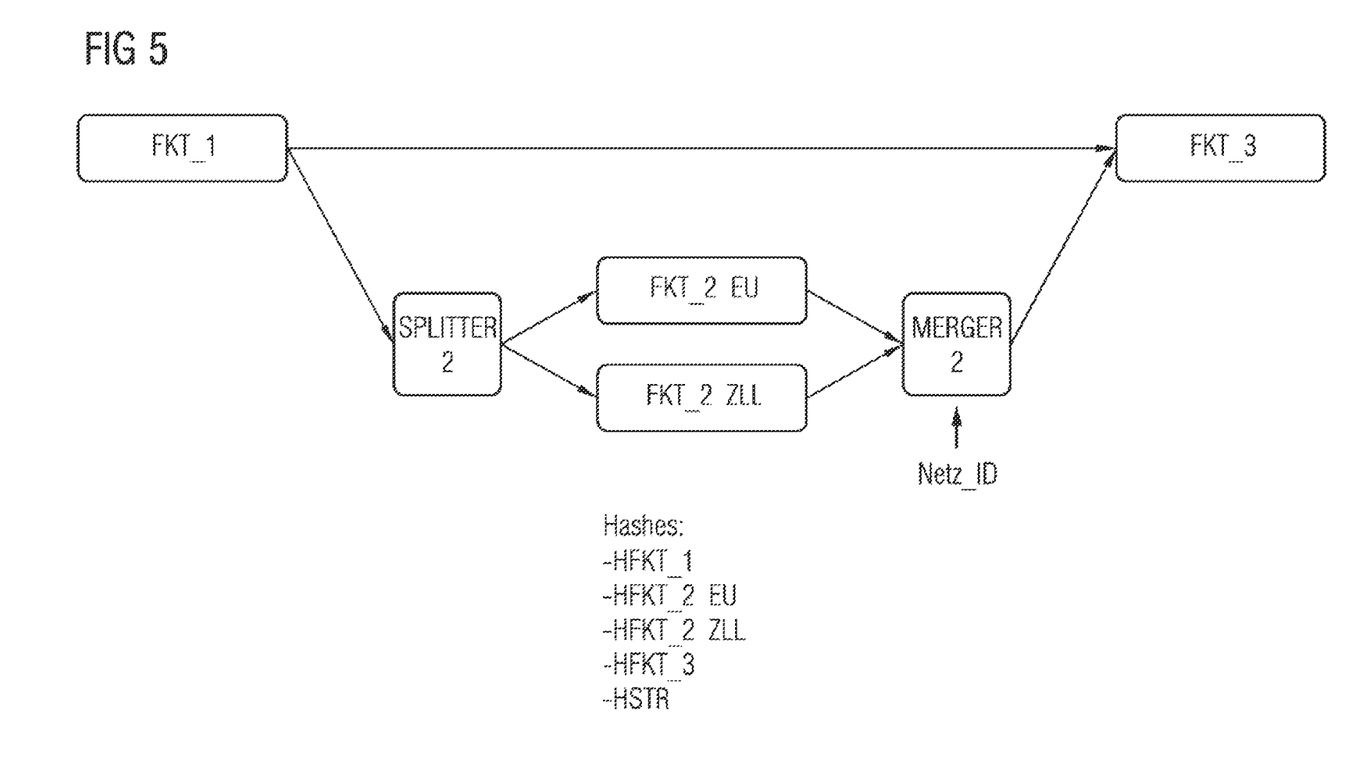
FIG. 5 shows, with reference to FIG. 3, a second advantageous development of the method according to the invention.

FIG. 5 shows, with reference to FIG. 3, a second advantageous development of the method according to the invention.

With regard to the respective input of the second function FKT_2 EU or FKT_2 ZLL and the output of the first function FKT_1, a splitter block SPLITTER2 is interposed, as shown.

With regard to the respective outputs of the second function FKT_2 EU or FKT_2 ZLL and the input of the third function FKT_3, a selection block MERGER2 is interposed.

A country-specific selection is made using the selection block MERGER 2, this being controlled with selection of the network identifier Netz_ID that is supplied.

This constellation is used when both functions FKT_2 EU and FKT_2 ZLL calculate respective results based on the supplied results from the first function FKT_1, but only one of these is intended to be passed on to the third function FKT_3 for further processing.

The splitter block SPLITTER 2 accordingly delivers results from the first function FKT_1 both to the function FKT_2 EU and to the function FKT_2 ZLL.

Both functions FKT_2 EU and FKT_2 ZLL, based thereon, calculate respective results that are each passed on to the selection block MERGER2.

A country-specific selection is then made using the selection block MERGER2, this being controlled with selection of the network identifier Netz_ID.

For the selection block MERGER2, the country identifier is Netz_ID=ZLL when the rail vehicle is located in the destination country. Accordingly, the country identifier for the selection block MERGER2 is Netz_ID=EU when the rail vehicle is located in the countries in Europe.

If the rail vehicle is located in the destination country ZLL, the calculated results from the second function FKT_2 ZLL are transmitted or switched through to the third function FKT_3 by the selection block MERGER2 using the network identifier Netz_ID=ZLL.

If the rail vehicle is located in countries in Europe, the calculated results from the second function FKT_2 EU are transmitted or switched through to the third function FKT_3 by the selection block MERGER2 using the network identifier Netz_ID=EU.

The structure STR is ascertained in the same way as already described above: depending on the signal flow through ascertained subnetworks, a multiplicity of points of intersection or branching points are ascertained and taken into consideration. Identified connections are substituted and ultimately a checksum of the structure HSTR is calculated.

The splitter block SPLITTER2 has no influence on the structure STR; it has a neutral function. It accordingly has no influence on the checksum HSTR, which is identical both for the countries in Europe and for the destination country.

The selection block MERGER2 has no influence on the structure STR; it has a neutral function and is used only for the country-specific selection of the results from the functions FKT_2 EU and FKT_2 ZLL. It accordingly has no influence on the checksum HSTR, which is identical both for the countries in Europe and for the destination country.

Figure 6:
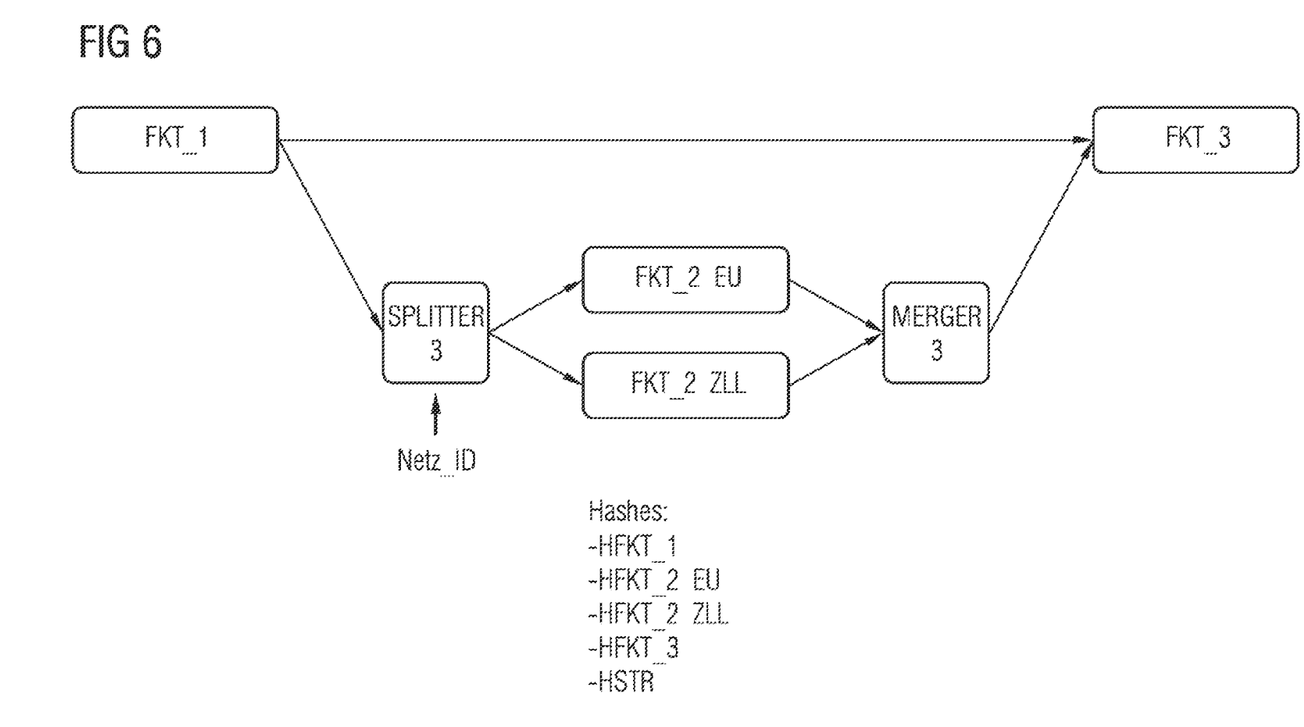
FIG. 6 shows, with reference to FIG. 3, a third advantageous development of the method according to the invention.

FIG. 6 shows, with reference to FIG. 3, a third advantageous development of the method according to the invention.

With regard to the respective input of the second function FKT_2 EU or FKT_2 ZLL and the output of the first function FKT_1, a splitter block SPLITTER3 is interposed as shown.

With regard to the respective outputs of the second function FKT_2 EU or FKT_2 ZLL and the input of the third function FKT_3, a selection block MERGERS is interposed.

A country-specific selection is made using the splitter block SPLITTER3, this being controlled with selection of the network identifier Netz_ID that is supplied.

This constellation is used when either the function FKT_2 EU or the function FKT_2 ZLL calculates a respective result based on supplied results from the first function FKT_1, which is then passed on to the third function FKT_3 for further processing.

The splitter block SPLITTER3 accordingly delivers results from the first function FKT_1 either to the function FKT_2 EU or to the function FKT_2 ZLL.

For the splitter block SPLITTER3, the country identifier is Netz_ID=ZLL when the rail vehicle is located in the destination country. Accordingly, the country identifier for the splitter block SPLITTER3 is Netz_ID=EU when the rail vehicle is located in the countries in Europe.

If the rail vehicle is located in the destination country ZLL, the calculated results from the first function FKT_1 are transmitted or switched through to the function FKT_2 ZLL by the splitter block SPLITTER3 using the network identifier Netz_ID=ZLL.

If the rail vehicle is located in countries in Europe, the calculated results from the first function FKT_1 are transmitted or switched through to the function FKT_2 EU by the splitter block SPLITTER3 using the network identifier Netz_ID=EU.

Based thereon, a respective result is calculated by the function FKT_2 EU or by the function FKT2_ZLL, which is then passed on by the selection block MERGER3 to the third function FKT_3 for further processing.

The structure STR is ascertained in the same way as already described above: depending on the signal flow through ascertained subnetworks, a multiplicity of points of intersection or branching points are ascertained and taken into consideration. Identified connections are substituted and ultimately a checksum of the structure HSTR is calculated.

The splitter block SPLITTER3 has no influence on the structure STR; it has a neutral function and is used only for the country-specific selection of the functions FKT_2 EU or FKT_2 ZLL. It accordingly has no influence on the checksum HSTR, which is identical both for the countries in Europe and for the destination country.

The selection block MERGER3 has no influence on the structure STR; it has a neutral function. It accordingly has no influence on the checksum HSTR, which is identical both for the countries in Europe and for the destination country.

In the context of one functionality not illustrated in more detail in the figures, it is possible, with regard to the figures FIG. 5 and FIG. 6, to appropriately interpose both a splitter block SPLITTER3 and a selection block MERGER2 in the functions. Both blocks are controlled using the country identifier Netz_ID. This refinement would be particularly safe during operation or additionally made safer in line with a possible client wish.

In the case of complex control software, a multiplicity of points of intersection or branching points should be taken into consideration depending on the signal flow when ascertaining subnetworks, these each having to be ascertained and taken into consideration.

In summary, in the invention, with regard to the control software, a structure for its interconnected functions is ascertained.

A structure-dependent checksum is ascertained or calculated for the structure in the form of a "hash".

The structure-dependent checksum clearly indicates an associated property of the structure.

A function-dependent checksum is ascertained or calculated for each function of the control software in the form of a "hash". The function-dependent checksum clearly indicates content or a property of the function.

An overall checksum is ascertained or calculated from the function-dependent checksums and from the structure-dependent checksum and constitutes a unique fingerprint for the control software.

The overall checksum thus clearly indicates content or a property of the control software.

An unchanged overall checksum indicates unchanged control software that does not have to be checked again and does not have to be authorized again.

A changed overall checksum indicates changed control software that has to be checked and authorized again.

The invention claimed is:

1. A method for identifying and verifying control software of a rail vehicle, wherein the control software being formed by functions, wherein each function of the functions performs a task respectively assigned thereto, wherein the functions, in their interconnected entirety, form a structure of the control software, which comprises the steps of:

creating a function-dependent checksum for each of the functions resulting in a plurality of function-dependent checksums;
creating a structure-dependent checksum for the structure;
creating an overall checksum for the control software from the function-dependent checksums and from the structure-dependent checksum, wherein the overall checksum identifies and verifies the control software for authorization in a country; and
displaying to a rail vehicle driver a version number of the control software based on the overall checksum of the control software for monitoring purposes.

2. The method according to claim 1, wherein:
in a case of unchanged functions and in the case of an unchanged structure of the control software, forming the overall checksum which indicates unchanged control software; and
in a case of a change to the control software for country-specific reasons, forming a country-specific function from a chosen unchanged function by changing the function and forming a country-specific overall checksum that differs from the overall checksum of the unchanged control software.

3. The method according to claim 2, wherein:
in a case of the unchanged functions and the unchanged structure of the control software, forming the overall checksum which indicates the unchanged control software; and
in a case of a change to the structure of the control software for the country-specific reasons, forming a country-specific structure, and forming the country-specific overall checksum that differs from the overall checksum of the unchanged control software.

4. The method according to claim 3, which further comprises:
activating and operating either the country-specific function or the unchanged function in the control software with an aid of a country identifier, in which, in a case of an activated country-specific function and in a case of the unchanged structure of the control software, the country-specific overall checksum of the control software is displayed for verification, wherein in a case of an activated unchanged function and in a case of the unchanged structure of the control software, the overall checksum of the unchanged control software is displayed for verification.

5. The method according to claim 4, which further comprises selecting the country identifier on a basis of a rail network in which the rail vehicle is located or into which the rail vehicle is traveling.

6. The method according to claim 4, which further comprises displaying the country identifier based on the overall checksum of the control software, to a rail vehicle driver for monitoring purposes.

7. The method according to claim 4, wherein:
in the control software, a first function supplies both the unchanged function and the country-specific function, as downstream functions, with results;
two of the downstream functions ascertain respective results; and
the country identifier functions as a selection block, and only one of the results is transmitted to a further function.

8. The method according to claim 4, wherein:
in the control software, using the country identifier, which acts on a selection block, a first function supplies either the unchanged function or the country-specific function, as downstream functions, with results;
one of the two downstream functions ascertains a respective result; and
an ascertained respective result is transmitted to a further function.

9. The method according to claim 1, wherein:
when ascertaining the structure, points of intersection are detected in a signal profile of the control software; and
connections identified by way of the points of intersection are substituted in order then to calculate the checksum of the structure.

\* \* \* \* \*